United States Patent
Matsuoka et al.

(10) Patent No.: US 9,638,850 B2
(45) Date of Patent: May 2, 2017

(54) POLARIZER, PROCESS FOR PREPARING THE SAME, OPTICAL MEMBER AND LIQUID CRYSTAL DISPLAYING APPARATUS

(75) Inventors: Yoshiki Matsuoka, Ibaraki (JP); Narutoshi Hayashi, Ehime (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 13/372,570

(22) Filed: Feb. 14, 2012

(65) Prior Publication Data

US 2012/0169973 A1    Jul. 5, 2012

Related U.S. Application Data

(62) Division of application No. 10/769,916, filed on Feb. 3, 2004, now abandoned.

(30) Foreign Application Priority Data

Feb. 12, 2003 (JP) ................................ 2003-033320

(51) Int. Cl.
    *G02B 5/30*      (2006.01)
    *G02B 1/10*      (2015.01)

(52) U.S. Cl.
    CPC ........... *G02B 5/3033* (2013.01); *G02B 1/105* (2013.01); *G02B 5/3083* (2013.01)

(58) Field of Classification Search
    CPC ..... G02B 5/3033; G02B 1/105; G02B 5/3083
(Continued)

(56) References Cited

U.S. PATENT DOCUMENTS 2,237,567 A * 4/1941 Land ................. 359/487.02
2,263,684 A * 11/1941 Ryan ................. F21V 9/10
                                                         359/487.02
(Continued)

FOREIGN PATENT DOCUMENTS

CN      1288522 A      3/2001
JP      55140816      11/1980
(Continued)

OTHER PUBLICATIONS

Notice of Submission of Argument for Korean Application No. 10-2004-0008539, dated Apr. 29, 2011.
(Continued)

*Primary Examiner* — Ricky D Shafer
(74) *Attorney, Agent, or Firm* — Sughrue Mion, PLLC

(57) ABSTRACT

An object of the present invention is to provide a polarizer which is thin and light as well as has durability, and an optical member capable of forming a liquid-crystalline displaying apparatus for mobiles which is excellent in reliance. According to the present invention, there is provided a polarizer, which comprises a protecting film comprising an epoxy resin as a main component on at least one side of a polarizing film. This polarizer can be produced by a method of coating an uncured epoxy resin composition on at least one side of a polarizing film, and then curing the composition to form a protecting film. Also, an optical member comprising a laminate of the aforementioned polarizer and other optical layer exhibiting the optical function is provided and, further, a liquid crystal displaying apparatus comprising the optical member disposed on one side or both sides of a liquid-crystalline cell is provided.

10 Claims, 1 Drawing Sheet

(58) Field of Classification Search
USPC .......... 359/487.01, 487.02, 489.07, 900;
349/96, 117, 122; 156/275.5
See application file for complete search history.

(56) References Cited

U.S. PATENT DOCUMENTS

| | | | | |
|---|---|---|---|---|
| 2,298,058 | A * | 10/1942 | Land | G02C 7/12 |
| | | | | 351/44 |
| 2,398,506 | A * | 4/1946 | Rogers | G02B 5/3033 |
| | | | | 264/1.34 |
| 3,208,902 | A * | 9/1965 | Arond et al. | 428/336 |
| 4,268,127 | A * | 5/1981 | Oshima et al. | 349/96 |
| 4,779,957 | A * | 10/1988 | Suginoya et al. | 349/122 |
| 5,244,713 | A * | 9/1993 | Nakamura et al. | 428/156 |
| 5,738,803 | A * | 4/1998 | Shepherd et al. | 252/299.1 |
| 6,074,741 | A | 6/2000 | Murata et al. | |
| 6,166,793 | A * | 12/2000 | Hayashi et al. | 349/113 |
| 6,417,904 | B1 | 7/2002 | Yamaoka et al. | |
| 6,419,366 | B1 * | 7/2002 | Namioka | 359/601 |
| 6,654,081 | B2 * | 11/2003 | Kawamoto et al. | 349/96 |
| 6,798,487 | B1 | 9/2004 | Ohtani et al. | |
| 6,956,630 | B2 * | 10/2005 | Ariyoshi et al. | 349/63 |
| 2002/0054258 | A1 * | 5/2002 | Kondo et al. | 349/113 |
| 2003/0038916 | A1 * | 2/2003 | Nakano et al. | 349/158 |

FOREIGN PATENT DOCUMENTS

| | | |
|---|---|---|
| JP | 56162721 | 12/1981 |
| JP | 06088907 | 3/1994 |
| JP | 6123807 | 5/1994 |
| JP | 07-168016 * | 7/1995 |
| JP | 9258021 | 10/1997 |
| JP | 9258023 | 10/1997 |
| JP | 10264284 | 10/1998 |
| JP | 200043202 | 2/2000 |
| JP | 2000199819 | 7/2000 |
| WO | WO 9936814 | 7/1999 |

OTHER PUBLICATIONS

Hupfield et al., The Effect of Moisture on the Cationic Polymerization, Dow Corning, available at http://www.dowcorning.com/content/webabstract/ABS_30-1011-01.asp (1998).

Andrew Hartwig, Influence of Moisture present during polymerisation on the properties of a photocured epoxy resin, 22 Int'l J. of Adhesion & Adhesives, 409-414 (2002).

* cited by examiner

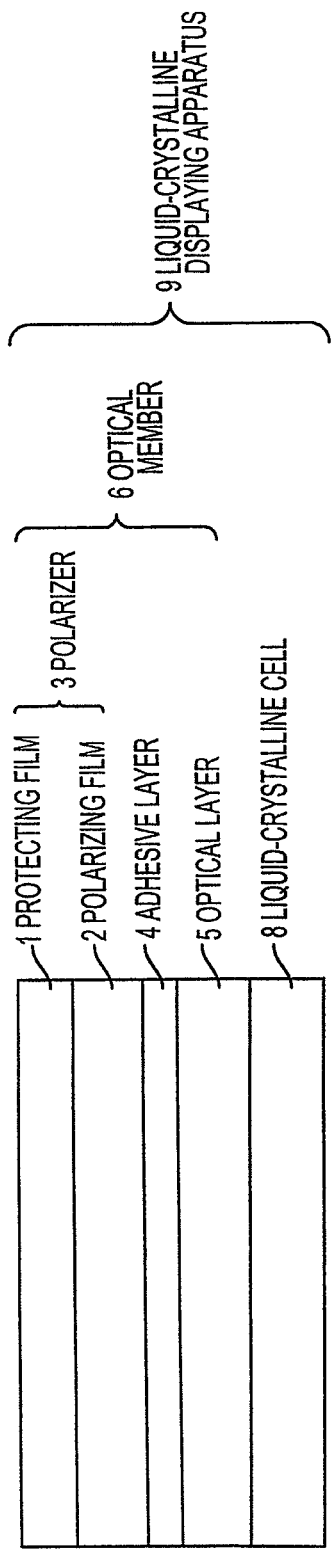

POLARIZER, PROCESS FOR PREPARING THE SAME, OPTICAL MEMBER AND LIQUID CRYSTAL DISPLAYING APPARATUS

CROSS-REFERENCE TO RELATED APPLICATION

This application is a Divisional of U.S. application Ser. No. 10/769,916, filed Feb. 3, 2004, which claims priority to JP 2003-033320, filed Feb. 12, 2003; the entire disclosures of each of which are incorporated herein by reference in their entirety.

FIELD OF THE INVENTION

The present invention relates to a polarizer which is thin and light weight, and is suitable for forming a liquid crystal display used for a cellular phone and so on, and a process for producing the same. The present invention also relates to an optical member and a liquid crystal displaying apparatus using the polarizer.

BACKGROUND OF THE INVENTION

A polarizer is widely used as an element providing polarized light for a liquid crystal displaying apparatus, and as an element detecting polarized light. As such the polarizer, a polarizing film composed of polyvinylalcohol to which a protecting film composed of triacetylcellulose is adhered, has been previously used. However, recently, with expansion of a liquid crystal displaying apparatus in mobile equipments such as a note-type personal computer and a cellular phone, thin and light polarizer are desired. In addition, since a mobile equipments are use in various place due to portability, improvement of the durability is also desired.

However, in the previous method of adhering a protecting film composed of triacetylcellulose to a polarizing film, from a viewpoint of the handling during producing process and the durability, it is difficult to make thickness of a protecting film below 20 μm. In order to solve such the problem, for example, JP 2000-199819 A discloses the method of forming a protecting film which is thin and has the better durability, by coating a solution of a cyclic polyolefin on at least one side of a polarizing film composed of hydrophilic polymer, and drying it.

An object of the present invention is to provide a polarizer which is thin and light as well as has durability, and an optical member which is excellent in reliance and can form a liquid crystal displaying apparatus used in mobiles.

SUMMARY OF THE INVENTION

That is, according to the present invention, there is provided a polarizer having a protecting film comprising an epoxy resin as a main component on at least one side of a polarizing film. This polarizer can be prepared by a method of coating an uncured epoxy resin composition on at least one side of a polarizing film, and curing the composition to form a protecting film. In addition, according to the present invention, there is provided an optical member comprising a laminate of the polarizer and an optical layer exhibiting other optical function than polarizing function and, further, there is provided a liquid crystal displaying apparatus comprising the optical member arranged on one side or both sides of a liquid crystal cell.

BRIEF DESCRIPTION OF THE DRAWINGS

The drawing illustrates one embodiment of a liquid-crystalline displaying apparatus according to the present invention.

Reference Numerals in the drawing are as follows:
1: Protecting film
2: Polarizing film
3: Polarizer
4: Adhesive layer
5: Optical layer
6: Optical member
8: Liquid-crystalline cell
9: Liquid-crystalline displaying apparatus

DESCRIPTION OF THE PREFERRED EMBODIMENTS

The present invention will be specifically explained below. As a polarizing film, a film of polyvinylalcohol in and/or on which a dichromatic coloring matter is adsorbed and oriented is generally used. The polyvinylalcohol constituting a polarizing film is obtained by saponifying polyvinylacetates. Examples of the polyvinylacetates include polyvinylacetate which is a homopolymer of vinyl acetate, a copolymer of vinyl acetate and other monomer which can be copolymerized with vinyl acetate, and the like. Examples of other monomer which is copolymerized with vinyl acetate include unsaturated carboxylic acids, olefins, vinylethers, unsaturated sulfonic acids, and the like. Degree of saponification of polyvinylalcohol is usually in a range of about 85 to about 100 mol %, preferably about 98 to about 100 mol %. The polyvinylalcohol may be further modified and, for example, polyvinylformal or polyvinylacetal modified with aldehydes, and the like may be used. Degree of polymerization of polyvinylalcohol is usually in a range of about 1,000 to about 10,000, preferably about 1,500 to about 10,000.

The polarizing film is produced by a process comprising a step of uniaxially stretching a film of polyvinylalcohol, a step of adsorbing a dichromatic coloring matter in and/or on the film of the polyvinylalcohol, a step of treating the film of polyvinylalcohol with the dichromatic coloring matter adsorbed therein and/or thereon with an aqueous boric acid solution, a step of washing the film with water after treatment with an aqueous boric acid solution, and a step of forming a protecting film on the uniaxially stretched film of polyvinyl alcohol in and/or on which the dichromatic coloring matter is adsorbed and oriented by these steps. Uniaxial stretching may be performed before dyeing with a dichromatic coloring matter, may be performed at the same time with dyeing with a dichromatic coloring matter, or may be performed after dying with a dichromatic coloring matter. When uniaxial stretching is performed after dyeing with a dichromatic coloring matter, this uniaxial stretching may be performed before treatment with boric acid, or may be performed during treatment with boric acid. In addition, uniaxial stretching may be also performed at these plural stages. For performing uniaxial stretching, a film may be uniaxially stretched between rolls having different peripheral velocity with each other, or may be uniaxially stretched using a hot roll. In addition, uniaxial stretching may be dry stretching which is performed in the air, or may be wet stretching which is performed in the state where a film is swollen with a solvent. A stretching ratio is around 4 to 8 times.

A method for dyeing a film of polyvinylalcohol with a dichromatic coloring matter includes, for example, a method in which a film of polyvinylalcohol may be soaked in an aqueous solution containing a dichromatic coloring matter. As the dichromatic coloring matter, iodine or a dichromatic dye may be used.

When iodine is used as a dichromatic coloring matter, a preferable method of dyeing a film of polyvinylalcohol is a method of immersing the film in an aqueous solution containing iodine and potassium iodide. A content of iodine in the aqueous solution is around 0.01 to 0.5 part by weight per 100 parts by weight of water, and a content of potassium iodide is around 0.5 to 10 parts by weight per 100 parts by weight of water. A temperature of the aqueous solution is usually around 20 to 40° C., and an immersing time in this aqueous solution is usually about 30 to 300 seconds.

On the other hand, when a dichromatic dye is used as the dichromatic coloring matter, a preferable method of dyeing a film of polyvinylalcohol is a method of immersing the film in an aqueous solution containing a water-soluble dichromatic dye. A content of a dichromatic dye in this aqueous solution is usually around $1 \times 10^{-3}$ to $1 \times 10^{-2}$ part by weight per 100 parts by weight of water. The aqueous solution may contain an inorganic salt such as sodium sulfate. A dyeing temperature in this case (temperature of aqueous dye solution) is usually around 20 to 80° C., and an immersing time in this aqueous solution is usually around 30 to 300 seconds.

Treatment with boric acid after dyeing with a dichromatic coloring matter is performed by immersing the dyed film of polyvinyl alcohol in an aqueous boric acid solution. A content of boric acid in an aqueous boric acid solution is usually around 2 to 15 parts by weight, preferably around 5 to 12 parts by weight per 100 parts by weight of water. When iodine is used as the dichromatic coloring matter, it is preferable that this aqueous boric acid solution contains potassium iodide. A content of potassium iodide in the aqueous boric acid solution is usually around 2 to 20 parts by weight, preferably 5 to 15 parts by weight per 100 parts by weight of water. An immersing time in the aqueous boric acid solution is usually around 100 to 1,200 seconds, preferably around 150 to 600 seconds, more preferably around 200 to 400 seconds. A temperature of the aqueous boric acid solution is usually 50° C. or higher, preferably 50 to 85° C.

The film of polyvinyl alcohol after treatment with boric acid is subjected to water washing treatment. Water washing treatment is performed, for example, by immersing the boric acid-treated film of polyvinylalcohol in water. A temperature of water at water washing treatment is around 5 to 40° C., and an immersing time is around 2 to 120 seconds. After washing with water, the film is subjected to drying treatment to obtain a polarizing film. Drying treatment may be performed using a hot air dryer or a far-infrared heater. A drying temperature is usually 40 to 100° C. A time for drying treatment is usually around 120 to 600 seconds.

Thus, a polarizing film in which a dichromatic coloring matter is adsorbed and oriented in and/or on a film of polyvinyl alcohol can be produced. A protecting film is formed on at least one side of this polarizing film to obtain a polarizer. In the present invention, a protecting film is formed by a method comprising coating a resin composition comprising, as a main component, epoxy resin which is excellent in transparency, adhesive strength, mechanical strength, thermal stability, water resistance and the like, and curing the composition. When a polarizer is produced by the above method, a dye type polarizing such as a polarizing film in which a dichromatic dye is adsorbed and oriented in and/or on a film of polyvinyl alcohol is preferably used, from the viewpoint that the polarizing film suffer less effect of heat or active energy ray of formation of protecting film. The present invention may be applied similarly to an iodine series polarizing film. An epoxy resin used in the present invention refers to a compound which has two or more epoxy groups in a molecule on average and is cured by a reaction. In this field, even a monomer is referred to as epoxy resin as far as it has two or more epoxy groups in a molecule.

In the present invention, from a viewpoint of the weather resistance, a refractive index, the cationic polymerization, and the like, it is preferable to use an epoxy resin containing no aromatic ring in a molecule as a main component. Examples of such epoxy resin containing no aromatic ring in a molecule include hydrogenated epoxy resin, alicyclic epoxy resin, aliphatic epoxy resin, and the like.

Hydrogenated epoxy resin can be obtained by a selective hydrogenation of aromatic rings in aromatic epoxy resin under a pressure in the presence of a catalyst. Examples of the aromatic epoxy resin include bisphenol-type epoxy resins such as diglycidyl ether of bisphenol A, diglycidyl ether of bisphenol F, and diglycidyl ether of bisphenol S; novolac-type epoxy resins such as phenol novolac epoxy resin, cresol novolac epoxy resin, and hydroxybenzaldehydiphenol novolac resin; polyfunctional-type epoxy resins such as glycidyl ether of tetrahydroxy phenylmethane, glycidyl ether of tetrahydroxybenzophenone, epoxylated polyvinyl phenol, and the like. It is preferable to use glycidyl ether of hydroganeted bisphenol A.

The alicyclic epoxy resin is a compound having at least one epoxy group bound to an alicylic ring in a molecule as shown by the following formula:

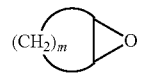

wherein m represents an integer of from 2 to 5.

A compound in which a group obtained by removing one or plural hydrogen atom (s) in $(CH_2)_m$ in this formula is bound to other chemical structure without aromatic ring is an alicyclic epoxy resin. In addition, hydrogen of an alicyclic ring may be substituted with a linear alkyl group such as a methyl group and an ethyl group. It is preferable to use a compound having an oxabicyclohexane ring (m=3 in the above formula) or an oxabicycloheptane ring (m=4 in the above formula). Structures of an alicyclic epoxy resin are as follows, but the structure is not limited to these compounds.

(1) Epoxycyclohexylmethyl epoxycyclohexanecarboxylates corresponding to the following formula (I):

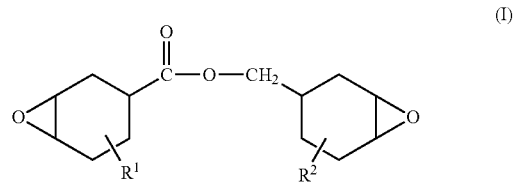

wherein $R^1$ and $R^2$ represent each independently a hydrogen atom or a linear alkyl group having a carbon number of 1 to 5.

(2) Alkanediol epoxycyclohexanecarboxylates corresponding to the following formula (II):

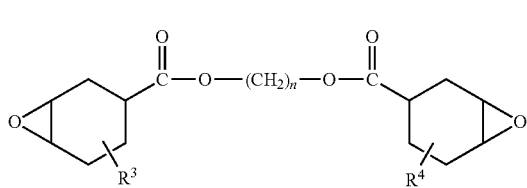

wherein $R^3$ and $R^4$ represent each independently a hydrogen atom or a linear alkyl group having a carbon number of 1 to 5, and n represents an integer of 2 to 20.

(3) Dicarboxylic acid epoxy cyclohexylmethyl esthers corresponding to the following formula (III):

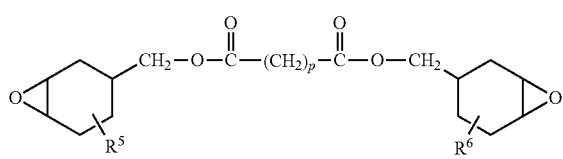

wherein $R^5$ and $R^6$ represent each independently a hydrogen atom or a linear alkyl group having a carbon number of 1 to 5, and p represents an integer 2 to 20.

(4) Polyethylene glycol epoxycyclohexylmethyl ethers corresponding to the following formula (IV):

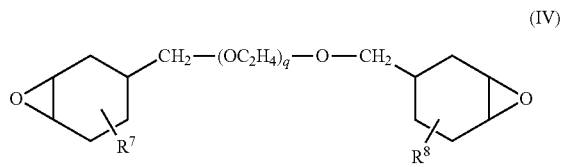

wherein $R^7$ and $R^8$ represent each independently a hydrogen atom or a linear alkyl group having a carbon number of 1 to 5, and q represents an integer 2 to 10.

(5) Alkanediol epoxycyclohexylmethyl ethers corresponding to the following formula (V):

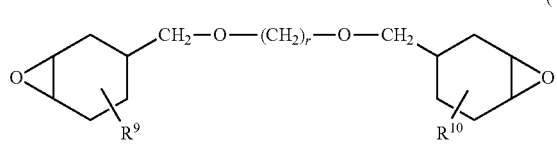

wherein $R^9$ and $R^{10}$ represent each independently a hydrogen atom or a linear alkyl group having a carbon number of 1 to 5, and r represents an integer of 2 to 20.

(6) Diepoxytrispiro compound corresponding to the following formula (VI):

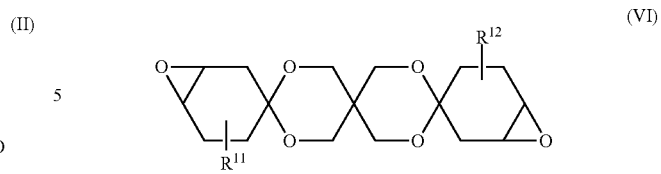

wherein $R^{11}$ and $R^{12}$ represent each independently a hydrogen atom or a linear alkyl group having a carbon number of 1 to 5.

(7) Diepoxymonospiro compound corresponding to the following formula (VII):

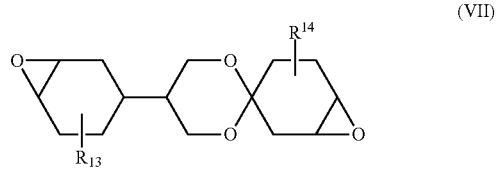

wherein $R^{13}$ and $R^{14}$ represent each independently a hydrogen atom or a linear alkyl group having a carbon number of 1 to 5. Vinylcyclohexenediepoxides corresponding to the following formula (VIII):

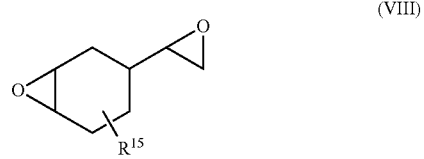

wherein $R^{15}$ represents a hydrogen atom or a linear alkyl group having a carbon number of 1 to 5.

(9) Epoxycyclopentyl ethers corresponding to the following formula (IX):

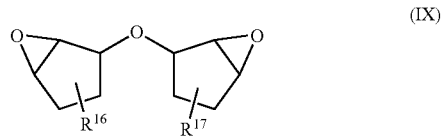

wherein $R^{16}$ and $R^{17}$ represent each independently a hydrogen atom or a linear alkyl group having a carbon number of 1 to 5.

(10) Diepoxytricyclodecanes corresponding to the following formula (X):

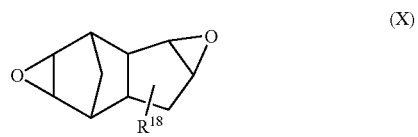

wherein $R^{18}$ represents a hydrogen atom or a linear alkyl group having a carbon number of 1 to 5.

Among them, a suitable alicyclic epoxy resin includes the following:

ester of 7-oxabicyclo[4.1.0]heptane-3-carboxylic acid and (7-oxa-bicyclo[4.1.0]hept-3-yl)methanol [compound wherein $R^1=R^2=H$ in formula (I)], ester of 4-methyl-7-oxabicyclo[4.1.0]heptane-3-carboxylic acid and (4-methyl-7-oxa-bicyclo[4.1.0]hept-3-yl)methanol [compound wherein $R^1=4\text{-}CH_3$, $R^2=4\text{-}CH_3$ in formula (I)], ester of 7-oxabicyclo[4.1.0]heptane-3-carboxylic acid and 1,2-ethanediol [compound wherein $R^3=R^4=H$, n=1 in formula (II)], ester of (7-oxabicyclo[4.1.0]hept-3-yl)methanol and adipic acid [compound wherein $R^5=R^6=H$, p=2 in formula (III)], ester of (4-methyl-7-oxabicyclo[4.1.0]hept-3-yl)methanol and adipic acid [compound wherein $R^5=4\text{-}CH_3$, $R^6=4\text{-}CH_3$, p=2 in formula (III)], ester of (7-oxabicyclo[4.1.0]hept-3-yl)methanol and 1,2-ethanediol [$R^9=R^{10}=H$, r=1 in formula (V)].

The aliphatic epoxy resin is polyglycidyl ether of aliphatic polyhydric alcohol or an alkylene oxide adduct thereof. Examples thereof include diglycidyl ether of 1,4-butanediol, diglycidyl ether of 1,6-hexanediol, triglycidyl ether of glycerin, triglycidyl ether of trimethylolpropane, diglycidyl ether of polyethylene glycol, diglycidyl ether of propylene glycol, polyglycidyl ethers of polyether polyol obtained by adding one or more alkylene oxides (ethylene oxide or propylene oxide) to aliphatic polyhydric alcohol such as ethylene glycol, propylene glycol and glycerin, and the like.

These epoxy resins herein may be used alone, or plural epoxy resins may be used by mixing them.

Equivalent of the epoxy resin used in the present invention is usually 30 to 3,000 g/eq, preferably 50 to 1,500 g/eq. When the equivalent weight of epoxy resin is below 30 g/eq, flexibility of a protecting film after curing may be reduced, or the adhering strength may be reduced. On the other hand, when the equivalent weight of epoxy resin exceeds 3,000 g/eq, the compatibility with other components may be reduced.

In the present invention, from a viewpoint of the reactivity, cation polymerization is preferably used as a reaction for curing an epoxy resin. Therefore, it is preferable to incorporate a cationic polymerization initiator into a resin composition. The cationic polymerization initiator generates a cationic species or Lewis acid by irradiation with active energy ray such as visible light, an ultraviolet ray, an X-ray, and an electron beam, or heating, whereby, initiates a reaction for polymerizing an epoxy group. It is preferable from a viewpoint of the workability that even any type of a cationic polymerization initiator is given the potentiality.

When the photocationic polymerization initiator, which generates a cationic species or Lewis acid by irradiation with active energy ray, is used, a protecting film may be form at a room temperature and a protecting film can be adhered better. In addition, since the photocationic polymerization initiator acts as a catalyst by irradiation of the light, the storage stability and the workability are excellent even when mixed into an epoxy resin. Examples of a photocationic polymerization initiator include an onium salt such as an aromatic diazonium salt, an aromatic iodonium salt and an aromatic sulfonium salt, and an iron-allene complex, and the like.

The aromatic diazonium salt include:
benzenediazonium hexafluoroantimonate,
benzenediazonium hexafluorophosphate,
benzenediazonium hexafluoroborate, and the like.

The aromatic iodonium salt include:
diphenyliodonium tetrakis(pentafluorophenyl)borate,
diphenyliodonium hexafluorophosphate,
diphenyliodonium hexafluoroantimonate,
di(4-nonylphenyl)iodonium hexafluorophosphate, and the like.

The aromatic sulfonium salt include:
triphenylsulfonium hexafluorophosphate,
triphenylsulfonium hexafluoroantimonate,
triphenylsulfonium tetrakis(pentafluorophenyl)borate,
4,4'-bis[diphenylsulfonio]diphenylsulfide bishexafluorophosphate,
4,4'-bis[di(β-hydroxyethoxy)phenylsulfonio]diphenylsulfide bishexafluoroantimonate,
4,4'-bis[di(β-hydroxyethoxy)phenylsulfonio]diphenylsulfide bisdhexafluorophosphate,
7-[di(p-toluoyl)sulfonio]-2-isopropylthioxanthonehexafluoroantimonate,
7-[di(p-toluoyl)sulfonio]-2-isopropylthioxanthonetetrakis(pentafluorophenyl)borate,
4-phenylcarbonyl-4'-diphenylsulfonio-diphenylsulfide hexafluorophosphate,
4-(p-tert-butylphenylcarbonyl)-4'-diphenylsulfonio-diphenylsulfide hexafluoroantimonate,
4-(p-tert-butylphenylcarbonyl)-4'-di(p-toluoyl)sulfonio-diphenylsulfide tetrakis(pentafluorophenyl)borate, and the like.

The iron-allene complex include:
xylene-cyclopentadienyliron(II) hexafluoroantimonate,
cumene-cyclopentadienyliron(II) hexafluorophosphate,
xylene-cyclopentadienyliron(II) tris(trifluoromethylsulfonyl)methanide, and the like.

These photocationic polymerization initiators may be used alone, or two or more of them may be used by mixing. Since an aromatic sulfonium salt has the ultraviolet absorbing property even in a wavelength region of 300 nm or longer, the salt is excellent in curing epoxy resin and, since the salt can give a cured material having the higher mechanical strength and adhering strength, the salt is preferably used.

These initiators are easily commercially available, such as "Kayarad PCI-220", "Kayarad PCI-620" (these are manufactured by Nippon Kayaku Co., Ltd.), "UVI-6990" (manufactured by Union Carbide Corporation), "Adekaoptomer SP-150", "Adekaopotomer SP-170" (these are manufactured by Asahi Denka Co., Ltd.), "CI-5102", "CIT-1370", "CIT-1682", "CIP-18665", "CIP-20485", "CIP-2064S" (these are manufactured by Nippon Soda Co., Ltd.), "DPI-101", "DPI-102", "DPI-103", "DPI-105", "MPI-103", "MPI-105", "BBI-101", "BBI-102", "BBI-103", "BBI-105", "TPS-101", "TPS-102", "TPS-103", "TPS-105", "MDS-103", "MDS-105", "DTS-102", "DTS-103" (these are manufactured by Midori Kagaku Co., Ltd.), "PI-2074" 'manufactured by Rhodia Ltd.), and the like, respectively, as a trade name. "CI-5102" manufactured by Nippon Soda Co., Ltd. is one of preferable initiators.

A content of the photocationic polymerization initiator is usually 0.5 to 20 parts by weight, preferably 1 part by weight or larger, and preferably 15 parts by weight or smaller per 100 parts by weight of an epoxy resin. When the content is below 0.5 part by weight resin, curing may become insufficient, and resultantly the mechanical strength and the adhering strength may be lowered. On the other hand, when the content exceeds 20 parts by weight, the hygroscopicity of a cured material becomes high due to increase in an ionic material in the cured material, and the durability may be lowered.

Further, if necessary, a photosensitizer may be used together. The reactivity is improved by use of the photosensitizer, and the mechanical strength and the adhering strength of a cured material may be improved. Examples of the photosensitizer include a carbonyl compound, an organosulfur compound, a persulfide, a redox series compound, azo and diazo compounds, a halogen compound, and a photoreductive pigment, and the like. Examples of the photosensitizer is not limited to, but include benzoin derivatives such as benzoin methyl ether, benzoin isopropyl ether, and α,α-dimethoxy-α-phenylacetophenone; benzophenone derivatives such as benzophenone, 2,4-dichlorobenzophenone, methyl o-benzoylbenzoate, 4,4'-bis(dimethylamino) benzophenone, 4,4'-bis(diethylamino)benzophenone; thioxanthone derivatives such as 2-chlorothioxanthone, and 2-isopropylthioxanthone; anthraquinone derivatives such as 2-chloroanthraquinone, and 2-methylanthraquinone; acridone derivatives such as N-methylacridone, and N-butylacridone; and α-α-diethoxyacetophenone, benzyl, fluorenone, xanthone, uranyl compound, and halogen compound, and the like. These may be used alone, or may be used by mixing. It is preferable that the photosensitizer is contained in a range of 0.1 to 20 parts by weight per 100 parts by weight of the photocationic polymerizable epoxy resin composition which is a mixture of epoxy resin and photocationic polymerization initiator as mentioned above.

Then, the thermal cationic polymerization initiator will be explained. The thermal cationic polymerization initiator is a compound which generates a cation species or Lewis acid by heating. Examples of the compound include a benzylsulfonium salt, a thiophenium salt, a thiolanium salt, benzylammonium, a pyridinium salt, a hydrazinium salt, carboxylic acid ester, sulfonic acid ester, amineimide, and the like. These initiators are easily commercially available, such as "Adekaptone CP77" and "Adekaptone CP66" (these are manufactured by Asahi Denka Co., Ltd.), "CI-2639" and "CI-2624" (these are manufactured by Nippon Soda Co., Ltd.), "Sunaid SI-60L", "Sunaid SI-80L" and "Saneid SI-100L" (these are manufactured by Sanshin Chemical Industry Co., Ltd.), and the like, respectively, as a trade name.

It may be useful technique to use above-explained photocationic polymerization and thermal cationic polymerization together.

The epoxy resin composition for forming a protecting film in the present invention may contain a compound which promotes cation polymerization, such as oxetanes and polyols.

The oxetanes are a compound having a 4-membered cyclic ether in a molecule, and examples thereof include 3-ethyl-3-hydroxymethyloxetane, 1,4-bis[(3-ethyl-3-oxetanyl)methoxymethyl]benzene, 3-ethyl-3-(phenoxymethyl) oxetane, di[(3-ethyl-3-oxetanyl)methyl]ether, 3-ethyl-3-(2-ethylhexyloxymethyl)oxetane, phenol novolac oxetane, and the like. These oxetane compounds are easily commercially available, such as "Allonoxetane OXT-101", "Allonoxetane OXT-121", "Allonoxetane OXT-211", "Allonoxetane OXT-221", and "Allonoxetane OXT-212" (these are manufactured by Toagosei Co., Ltd.), respectively as a trade name. These oxetane ring-containing compounds are usually used at a ratio of 5 to 95% by weight, preferably 30 to 70% by weight in an epoxy resin composition.

Polyols having no acidic group other than a phenolic hydroxy group are preferable, and examples thereof include a polyol compound having no functional group other than a hydroxy group, a polyester polyol compound, a polycaprolactone polyol compound, a polyol compound having a phenolic hydroxy group, polycarbonate polyol, and the like. A molecular weight of these polyols is usually 48 or larger, preferably 62 or larger, more preferably 100 or larger, further preferably 1,000 or smaller. A content of these polyols is usually 50% by weight or smaller, preferably 30% by weight or smaller in an epoxy resin compositions.

Further, other additives such as an ion trapping agent, an antioxidant, a chain transferring agent, a sensitizer, an tacking fire, a thermoplastic resin, a filler, a flow adjusting agent, a plasticizer, and an anti-forming agent may be added to an epoxy resin composition. Examples of the ion trapping agent include powdery inorganic compounds such as a bismuth series, an antimony series, a magnesium series, an aluminum series, a calcium series, a titanium series and a mixture series thereof, and examples of the antioxidant include a hindered phenol series antioxidant and so on.

A protecting film in the present invention is formed by coating an uncured epoxy resin composition on at least one side of a polarizer, and then curing the coated layer by irradiation with active energy ray such as a visible light, an ultraviolet ray, an X-ray, an electron beam and the like and/or heating.

A method of coating a polarizing film is not particularly limited, but various coating apparatus such as a doctor blade, a wire bar, a die coater, a comma coater, and a gravure coater can be utilized. Since each coating apparatus has each optimal viscosity range, it is also useful to adjust a viscosity using a solvent. As a solvent therefor, solvents which do not deteriorate the optical performance of the polarizer and dissolve an epoxy resin composition well are used, and a kind of the solvent is not particularly limited. For example, organic solvents such as hydrocarbons represented by toluene, and esters represented by ethyl acetate can be used.

When polymerization is performed by irradiation with active energy ray, a light source to be used is not particularly limited, but light sources having an emission distribution at a wavelength of 400 nm or shorter, such as a low pressure mercury lamp, an intermediate pressure mercury lamp, high pressure mercury lamp, an ultrahigh pressure mercury lamp, a chemical lamp, a black light lamp, a microwave excitation mercury lamp, a metal halide lamp can be used. A light intensity to be irradiated to an epoxy resin composition is determined depending on a composition used, and is not particularly limited, however, it is preferable that an irradiation intensity at a wavelength region which is effective in activating an initiator is 0.1 to 100 mW/cm$^2$. When a light intensity to be irradiated to a resin composition is smaller than 0.1 mW/cm$^2$, a reaction time may become too long and, when the intensity exceeds 100 nW/cm$^2$, yellowing of an epoxy resin composition and deterioration of a polarizing film may be caused by the heat generated by radiation from a lamp or by exothermal polymerization of the composition. A light irradiation time to a composition is determined depending on a composition to be cured, and is not particularly limited, however, it is preferable to set the time so that an accumulated light amount obtained from a product of irradiation intensity and an irradiation time becomes 10 to 5,000 mJ/cm$^2$. When an accumulated light amount to the epoxy resin composition is smaller than 10 mJ/cm$^2$, generation of an active species derived from an initiator may not be sufficient, and curing of the resulting protecting film may become insufficient. On the other hand, when an accumulated light amount exceeds 5,000 mJ/cm$^2$, an irradiation time may become very long, whereby improving the productivity may not be sufficient.

When polymerization is performed by the heat, heating can be performed by the generally known method, and the conditions therefor, and so on, are not particularly limited. Usually, heating is performed at such a temperature that a thermal cation polymerization initiator incorporated into an epoxy resin composition generates a cation species or Lewis acid, or higher temperature, usually from about 50 to about 200° C.

When curing is performed under any condition of irradiation with an active energy ray or heat, it is preferable to perform curing in such a range that various performances such as a polarization degree and a transmittance of a polarizing film are not lowered. From a viewpoint of thinning and light weight, protecting function, handling and the like, a thickness of a protecting film is preferably 40 µm or smaller, more preferably 20 µm or smaller. When a protecting film is provided on both sides of a polarizing film, protecting films having different compositions on one side from the other may be used.

In a polarizer on which a protecting film comprising the aforementioned epoxy resin composition is provided in the present invention, if necessary, various layers such as a hard coating layer, a anti-reflection layer, and a anti-glare layer may be formed on the protecting film.

An optical member in which an optical layer exhibiting the optical function other than the polarizing function is provided via a protecting film layer in the present invention, may be obtained. Examples of an optical layer provided on a polarizer for the purpose of forming an optical member include a reflecting layer, a semi-transmission type reflecting layer, a light diffusing layer, a phase retardation plate, a light collecting plate, a luminance improving film and the like, which are used in forming a liquid crystal displaying apparatus and the like. The aforementioned reflecting layer, a semi-transmission type reflecting layer and a light diffusing layer are used when an optical member comprising a polarizing plate of reflection type or semi-transmission type, diffusion type, or combined type is formed.

A reflection-type polarizing plate is used in a liquid crystal displaying apparatus of such a type that reflects an incident light from a recognition side to display it, and a light source such as a back light can be omitted, whereby, a liquid crystal displaying apparatus is easily thinned. In addition, a semi-transmission type polarizing plate is used in a liquid crystal displaying apparatus of such a type that displays as a reflection-type in light places, and via a light source such as a backlight in dark places. In an optical member as a reflection type polarizer, a reflecting layer can be formed, for example, by providing a foil or a deposition film composed of a metal such as aluminum on a protecting film on a polarizer. In addition, an optical member as a semi-transmission type polarizer can be formed by converting the aforementioned reflecting layer into a half mirror, or adhering a reflecting plate containing a pearl pigment and the like and exhibiting the light transmission onto a polarizer. On the other hand, in an optical member as a diffusion-type polarizer, a fine structure of roughness is formed on the surface thereof, for example, by using various methods such as a method of performing mat treatment on a protecting film on a polarizer, a method of coating a fine particle-containing resin, and a method of adhering a fine particle-containing film.

Further, formation of an optical member as a polarizer for reflection and diffusion can be performed, for example, by a method of providing on a fine structural of surface roughness of a diffusion-type polarizer a reflecting layer representing the structure of roughness. A reflecting layer having a fine structure of roughness has advantages that it diffuses an incident light by irregular reflection, prevents directivity and glare, and suppresses uneveness of light and darkness. A resin layer or film containing a fine particle has an advantage that it is diffused when an incident light and a reflecting light therefrom transmit through the layer, whereby suppressing uneveness of light and darkness. A reflecting layer representing a fine structure of surface roughness can be formed by directly providing a metal on the surface having a fine structure of roughness, for example, by methods of deposition such as vacuum deposition, ion plating, sputtering and the like, plating and the like. As a fine particle to be incorporated for forming a fine structure of surface roughness, inorganic fine particles composed of silica, aluminum oxide, titanium oxide, zirconia, tin oxide, indium oxide, cadmium oxide, antimony oxide and the like, and organic fine particles composed of cross-linked, uncross-linked polymers, or the like, which have an average particle diameter of 0.1 to 30 µm can be utilized.

On the other hand, the aforementioned phase retardation plate as an optical layer is used for the purpose of compensating for a phase difference due to a liquid-crystalline cell and so on. Examples thereof include birefringent films composed of stretched films of various plastics and so on, films in which a discotheque liquid-crystalline or a nematic liquid-crystalline is orientation-fixed, and film substrates on which the aforementioned liquid-crystalline layer is formed, and the like. In this case, as a film substrate for supporting an oriented liquid-crystalline layer, cellulose series films such as triacetylcellulose are preferably used.

Examples of a plastic for forming the birefringent film include polycarbonate, polyvinyl alcohol, polystyrene, polymethyl methacrylate, polyolefin such as polypropylene, polyarylate, polyamide and the like. The stretched film may be a film which was appropriately uniaxial- or biaxial-stretched. In addition, birefringent films in which a refractive index in a direction of a film thickness is controlled by applying a constricting force and/or a stretching force under adhesion between a thermally constricting film may be used. For the purpose of controlling the optical properties such as band broadening, two or more of retarder may be used in combination.

The light collecting plate is used for the purpose of optical path control and so on, and may be formed as a prism array sheet, a lens array sheet, a dot-provided sheet, or the like.

The luminance improving film is used for the purpose of improving a luminance in a liquid-crystalline displaying apparatus and the like, and examples thereof include a reflection-type polarization separating sheet designed to laminate plural thin films having different refractive index anisotropies to generate anisotropy in a reflectance, an oriented film of a cholesteric liquid-crystalline polymer, a circularly polarized separating sheet in which an oriented liquid-crystalline layer thereof is supported on a film substrate, and the like.

The optical member can be produced by combining a polarizer with one or more optical layers selected from the aforementioned reflecting layer or semi-transmission reflecting layer, light diffusing layer, retarder, light collecting plate, luminance improving film and the like depending on the use purpose, to obtain a laminate of two or more layers. In that case, two or more optical layers such as the light diffusing layer, the retarder, the light collecting plate and the luminance improving film may be disposed respectively. Disposition of each optical layer is not particularly limited.

Various optical layers for forming the optical member are integrated by using an adhesive, and an adhesive used therefor is not particularly limited as far as an adhered layer is formed better. From a viewpoint of simplicity of the adhering working, prevention of occurrence of optical distortion, and the like, it is preferable that a self-adhesive (also referred to as pressure-sensitive adhesive) is used. As the self-adhesive, those using acrylic polymers, silicone polymers, polyesters, polyurethanes, polyethers, or the like as a base polymer can be used. An acrylic polymers self-adhesive, is preferable since they are excellent in the optical transparency, retain the appropriate wettability and cohesive force, are also excellent in the adherability with a substrate, further have the weather resistance, heat resistance, and the like, do not cause a peeling problem such as lifting and peeling under the conditions of heating and moistening. In the acrylic polymers self-adhesive, an acrylic copolymer having a weight average molecular weight of 100,000 or larger obtained by copolymerizing an alkyl ester of (meth) acrylic acid having an alkyl group of a carbon number of 20 or less such as a methyl group, an ethyl group and a butyl group, with a functional group-containing acrylic monomer comprising (meth)acrylic acid, hydroxyethyl (meth)acrylate, or the like so that a glass transition temperature becomes preferably 25° C. or lower, more preferably 0° C. or lower is preferable.

Formation of a self-adhesive layer on a polarizer can be performed by dissolving or dispersing a self-adhesive composition in an organic solvent such as toluene or ethyl acetate to prepare a 10 to 40% by weight solution, and coating the solution directly on a polarizer to form a self-adhesive layer, or by forming a self-adhesive layer on a protecting film in advance, and transferring the layer onto a polarizer to form a self-adhesive layer. A thickness of a self-adhesive layer is determined depending on its adhering force or the like, and is usually in a range of about 1 to about 50 µm.

If necessary, a filler composed of a glass fiber, a glass bead, a resin bead, a metal powder, other inorganic powder or the like, a pigment, a coloring agent, an antioxidant, an ultraviolet absorbing agent and the like may be incorporated into a self-adhesive layer. Examples of the ultraviolet absorbing agent include a salicylic acid ester series compound, a benzofenone series compound, a benzotriazole series compound, a cyanoacrylate series compound, and a nickel complex salt series compound, and the like.

The optical member may be disposed on one side or both sides of a liquid-crystalline cell. A liquid-crystalline cell used is arbitrary. For example, a liquid-crystalline displaying apparatus can be formed by using various liquid-crystalline cells such as active matrix-driving type represented by a thin film transistor type, and a simple matrix-driving type represented by super twisted nematic type. Optical members provided on both sides of a liquid-crystalline cell may be the same or different.

EXAMPLES

Examples of the present invention will be shown below, but the present invention is not limited by these Examples.

Example 1

10.0 g of trade name "Epicoat YX8000" which is a hydrogenated epoxy resin manufactured by Japan Epoxy Resins Co., Ltd., 4.0 g of trade name "CI5102" which is a photocationic polymerization initiator manufactured by Nippon Soda Co., Ltd. and 1.0 g of trade name "CS7001" which is a photosensitizer manufactured by Nippon Soda Co., Ltd. were weighed into a 100 ml disposable cup, the materials were mixed and defoamed and the mixture was coated on the surface of a polyvinyl alcohol-dye type polarizer using an applicator having a clearance of 100 µm. After coating, this polarizing film was passed once through an ultraviolet irradiating apparatus manufactured by Japan Storage Battery Co., Ltd. (an ultraviolet ray lamp "HAL 400NL" was used at 80 W, and an irradiation distance was 50 cm) at a line rate of 1.0 m/min. Thereupon, the curability of an epoxy resin composition was found good. In addition, the adherability with a polarizing film was assessed by a grid method described in JIS K 5400, and the number of non-peeled grid relative to the number of formed grid was 100/100, demonstrating the better adherability. Further, the polarizing performance was assessed by using a spectrophotometer (trade name "UV2200") manufactured by Shimadzu Corporation, a simple transmittance was found to be 38.9% and a polarization degree was found to be 99.98%, maintaining the excellent polarizing performance also after a curing reaction.

The trade name "Epicoat YX 8000" used herein which is a hydrogenated epoxy resin is diglycidyl ether of nuclear hydrogenated bisphenol A, and has an epoxy equivalent weight of about 205 g/eq.

Example 2

7.0 g of a hydrogenated epoxy resin "Epicoat YX8000", 3.0 g of trade name "Allonoxetane OXT-121" which is an oxetane resin manufactured by Toagosei Co., Ltd., 4.0 g of a photocationic polymerization initiator "CI5102" and 1.0 g of a photosensitizer "CS7001" were weighed into a 100 ml disposable cup, the materials were mixed and defoamed, and the mixture was coated on the surface of a polyvinyl alcohol-dye type polarizing film using an applicator having a clearance of 100 µm. After coating, this polarizer was passed once through the same ultraviolet ray irradiating apparatus as that used in Example 1 at a line rate of 1.0 m/min. Thereupon, the curability of an epoxy resin composition was better. In addition, the adherability with a polarizing film was assessed by a grid method described in JIS K 5400, and the number of non-peeled grid relative to the number of formed grid was 100/100, demonstrating the better adherability. Further, the polarizing performance was assessed as in Example 1, a simple transmittance was found to be 38.6% and a polarizing degree was found to be 99.96%, maintaining the excellent polarizing performance also after a curing reaction.

The oxetane resin "Allonoxetane OXT-121" used herein is a mixture containing 1,4-bis[(3-ethyl-3-oxetanyl)methoxymethyl]benzene as a main component and ten and a few % of di(3-ethyl-3-oxetanylmethyl)ether which is a dimer or a higher multimer of p-xylilene glycol.

Example 3

7.0 g of trade name "Epicoat YX 8034" which is a hydrogenated epoxy resin manufactured by Japan Epoxy Resins Co., Ltd., 3.0 g of trade name "Adekaoptomer KRM2199" which is an alicyclic epoxy resin manufactured by Asahi Denka Co., Ltd., and 1.5 g of trade name "Adekaoptone CP77" which is a thiolanium salt series thermal cation polymerization initiator manufactured by Asahi Denka Co., Ltd. were weighed into a 100 ml disposable cup, the materials were mixed and defoamed, and the mixture was coated on the surface of a polyvinyl alcohol-dye type polarizer using an applicator having a clearance of 100 µm. After coating, this polarizing film was allowed to stand for 10 minutes in a hot air oven heated at 130° C. Thereupon, the curability of an epoxy resin composition was better. In addition, the adherability with a polarizing film was assessed by a grid test described in JIS K 5400, and the number of non-peeled grid relative to the number of formed grid was 100/100, demonstrating the better adherability. Further, the polarizing performance was assessed as in Example 1, a simple transmittance was found to be 37.1% and a polarizing degree was 99.97%, maintaining the excellent polarizing performance also after a curing reaction.

The hydrogenated epoxy resin "Epicoat YX8034" used herein is a diglycidyl ether of nuclear hydrogenated bisphenol A, and has an epoxy equivalent weight of about 290 g/eq.

Comparative Example 1

A 30% by weight toluene solution of trade name "Arton" which is a cyclic polyolefin resin manufactured by JSR Corporation was prepared, and this solution was coated on the surface of a polyvinyl alcohol-iodine type polarizing film using an applicator having a clearance of 100 μm. After coating, this polarizing film was dried for 10 minutes in a hot air oven heated at 100° C. After drying, the adherability with a polarizing film was assessed by a grids method described in JIS K 5400, and the number of non-peeled grids relative to the number of formed grids was 0/100, demonstrating no adherability with a polarizing film.

According to the present invention, there can be easily obtained a polarizer which has the durability and is thin and light while maintaining the better adherability with a polarizing film. As a result, thin and light polarizer and optical members which can well stand the heating treatment at apparatus assembling and the environmental conditions at use of an apparatus can be obtained, and liquid-crystalline displaying apparatuses for mobiles which are excellent in reliance can be formed by using them.

What is claimed is:

1. A polarizer comprising a polarizing film and a protecting film provided directly on at least one surface of the polarizing film, wherein
   the protecting film is formed by curing an uncured epoxy resin composition by cationic polymerization with irradiation of active energy ray,
   the uncured epoxy resin comprises an epoxy resin as a main component,
   the epoxy resin contains no aromatic ring in a molecule,
   the polarizing film is a film of polyvinyl alcohol, and the film of polyvinyl alcohol has a dichromatic coloring matter either absorbed and oriented in the film of polyvinyl alcohol, absorbed and oriented on the film of polyvinyl alcohol, or absorbed and oriented both in and on the film of polyvinyl alcohol,
   the epoxy resin has an epoxy equivalent weight of from 50 to 1,500 g/eq, and
   a thickness of the protecting film is 40 μm or smaller.

2. An optical member comprising a laminate of the polarizer according to claim 1 and an optical layer exhibiting an optical function.

3. The optical member according to claim 2, wherein the optical layer exhibiting the optical function is a retarder.

4. A liquid-crystalline displaying apparatus comprising a liquid-crystalline cell and the optical member according to claim 3 which is disposed on one side or both sides of the liquid-crystalline cell.

5. A liquid-crystalline displaying apparatus comprising a liquid-crystalline cell and the optical member according to claim 2 which is disposed on one side or both sides of the liquid-crystalline cell.

6. The polarizer according to claim 1, wherein the protecting film is provided directly on both surfaces of the polarizing film, such that a first protecting film is formed on one side of the polarizing film and a second protecting film is formed on the other side of the protecting film.

7. The polarizer according to claim 6, wherein the first protecting film has a different composition from the second protecting film.

8. The polarizer according to claim 1, wherein the epoxy resin has an epoxy equivalent weight of from 50 to 1,000 g/eq.

9. The polarizer according to claim 1, wherein a thickness of the protecting film is from 5 μm to 40 μm.

10. A process for producing a polarizer comprising coating an uncured epoxy resin composition directly on at least one surface of a polarizing film, and then curing the composition by cationic polymerization with irradiation of active energy ray to form a protecting film, wherein
   the uncured epoxy resin composition comprises an epoxy resin as a main component,
   the epoxy resin contains no aromatic ring in a molecule,
   the polarizing film is a film of polyvinyl alcohol, and the film of polyvinyl alcohol has a dichromatic coloring matter either absorbed and oriented in the film of polyvinyl alcohol, absorbed and oriented on the film of polyvinyl alcohol, or absorbed and oriented both in and on the film of polyvinyl alcohol,
   the epoxy resin has an epoxy equivalent weight of from 50 to 1,500 g/eq, and
   a thickness of the protecting film is 40 μm or smaller.

* * * * *